US007081905B1

(12) United States Patent
Raghunath

(10) Patent No.: US 7,081,905 B1
(45) Date of Patent: Jul. 25, 2006

(54) METHOD AND APPARATUS FOR DYNAMICALLY CONTROLLING SCROLLER SPEED EMPLOYED FOR A USER INTERFACE OF A WEARABLE APPLIANCE

(75) Inventor: Mandayam T. Raghunath, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 718 days.

(21) Appl. No.: 09/607,801

(22) Filed: Jun. 30, 2000

(51) Int. Cl.
*G09G 5/00* (2006.01)
*G04B 17/00* (2006.01)
*G04B 17/30* (2006.01)

(52) U.S. Cl. .................. 345/684; 368/69; 368/186
(58) Field of Classification Search ............... 345/184, 345/684, 685, 686, 687, 784; 368/69, 185, 368/189, 184
See application file for complete search history.

(56) References Cited

U.S. PATENT DOCUMENTS

| 4,043,111 | A | * | 8/1977  | Fujita ........................... 345/157 |
| 4,067,187 | A | * | 1/1978  | Sekiya et al. ................. 345/156 |
| 4,526,476 | A | * | 7/1985  | Nakayama et al. ............ 345/184 |
| 4,549,173 | A | * | 10/1985 | Nakamura ..................... 345/184 |
| 4,855,971 | A | * | 8/1989  | Meisner et al. ............... 368/189 |
| 5,371,846 | A | * | 12/1994 | Bates ............................. 345/684 |
| 5,477,508 | A | * | 12/1995 | Will .............................. 368/189 |
| 5,790,819 | A | * | 8/1998  | Rosenburg et al. .......... 345/160 |
| 5,825,353 | A | * | 10/1998 | Will .............................. 345/184 |
| 6,208,343 | B1 | * | 3/2001 | Roth ............................. 345/163 |
| 6,288,705 | B1 | * | 9/2001 | Rosenberg et al. .......... 345/157 |
| 6,292,174 | B1 | * | 9/2001 | Mallett et al. ................ 345/156 |

OTHER PUBLICATIONS

"The World's Smallest PDA Computer Watch", Hammacher Schlemmer Mid Summer 2000 Catalog, p. 3.

* cited by examiner

*Primary Examiner*—Ryan Yang
(74) *Attorney, Agent, or Firm*—Scully, Scott, Murphy & Presser, P.C.; Marian Underweiser, Esq.

(57) ABSTRACT

A wearable mobile computing device/appliance (e.g., a wrist watch) with a high resolution display that is capable of wirelessly accessing information from the network and a variety of other devices. The Wrist Watch device/appliance includes a user interface that is used to efficiently interact with alarms, time keeping functions and notifications on the watch via use of a scroll device implementing dynamic scroll speed controller capability which enables seamless fine-grain and coarse-grain scroll and/or cursor movement through displayed content without notice to the user of the scroll device.

11 Claims, 3 Drawing Sheets

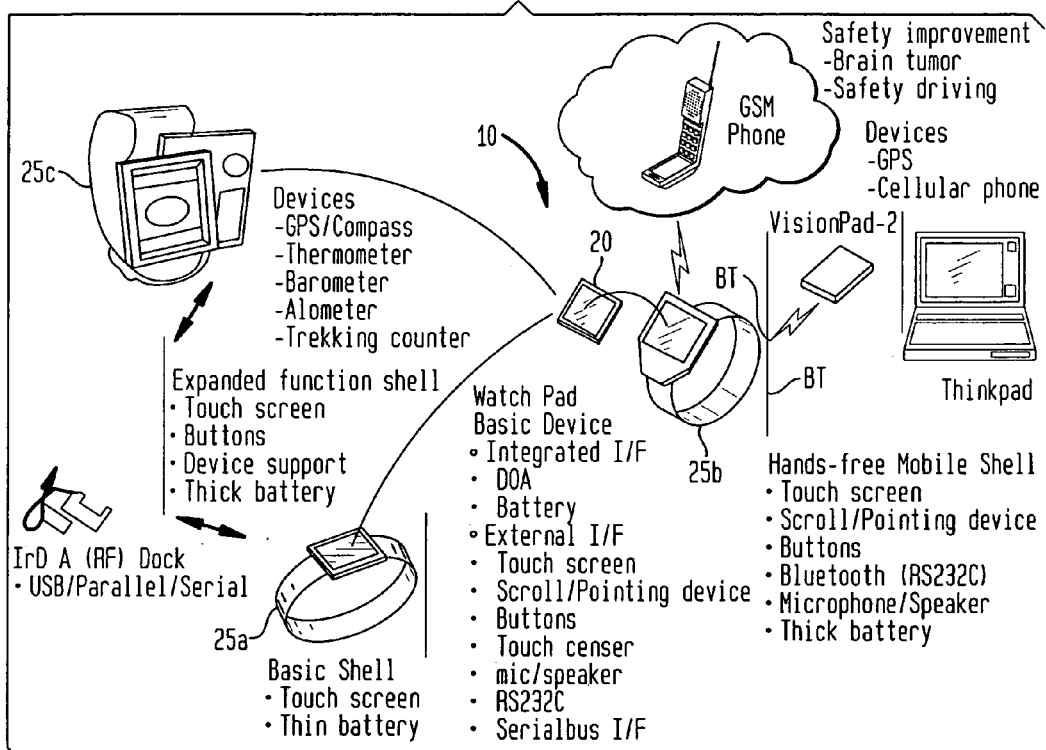
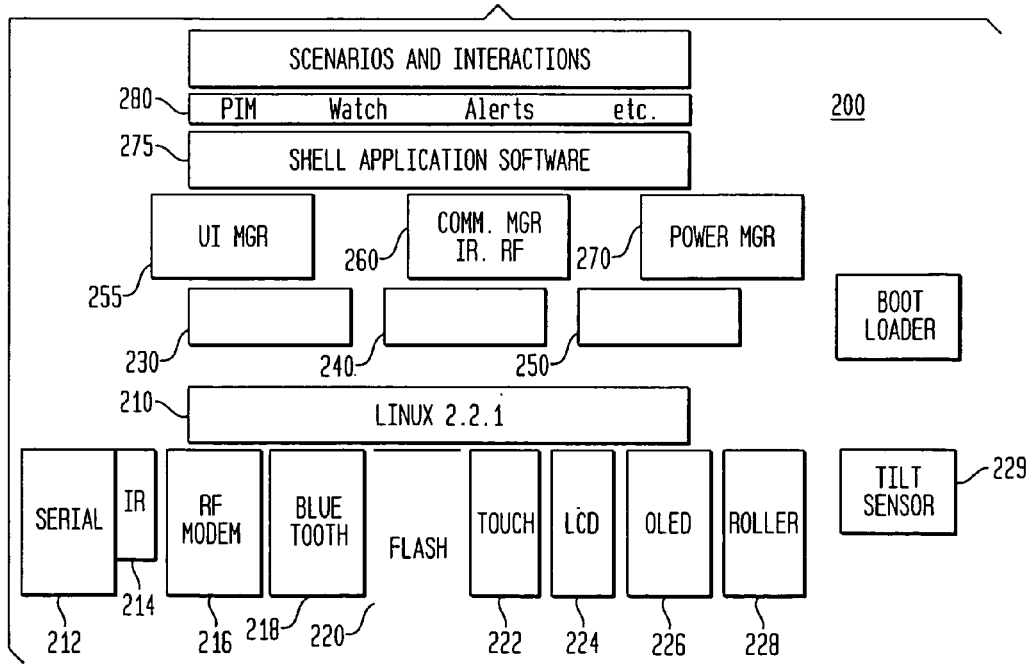

METHOD AND APPARATUS FOR DYNAMICALLY CONTROLLING SCROLLER SPEED EMPLOYED FOR A USER INTERFACE OF A WEARABLE APPLIANCE

BACKGROUND OF THE INVENTION

1. Field of the Invention

This invention relates generally to mobile computing devices such as personal digital assistants (PDAs), cellular phones, pagers, and the like, and more specifically, to a wearable device/appliance (e.g., a wrist watch) capable of wirelessly accessing information and equipped with an interactive user interface and high-resolution display including a scroll device implementing dynamic speed control for enabling seamless fine-grain and coarse-grain scroll and/or cursor movement through displayed content without notice to the user of the scroll device.

2. Discussion of the Prior Art

Computing, mobile and wireless communications technologies have been rapidly advancing-culminating in a variety of powerful user friendly devices such as personal digital assistants (PDAs), cellular phones, pagers, etc. Today, it is possible to purchase handheld PDA's, e.g., palmtops such as the Palm Pilot®, that employ wireless communication devices and that combines computing, telephone/fax, and networking features. A typical PDA may function as a cellular phone, fax sender, and personal organizer and are pen-based, requiring a stylus for text entry. As such, these device incorporate handwriting recognition features and may even employ voice recognition technologies that react to voice input. Small devices such as the RIM 950 and the Motorola PageWriter 2000 pager use a small keyboard for input.

Today, the industry is striving to provide advancements by providing increased PC desktop-like functionality while both decreasing size and power requirements. More recently there have been attempts to incorporate some of the capabilities of the above devices into wrist watches. However, today, only special wearable watch devices are available that, besides time keeping functions, may possess a compass, or a Global Positioning System (GPS), or barometer, heart rate monitor, Personal Handy System (PHS) phone, pager, etc. There are shortcomings in these existing special function watches in that most of them are bulky, are mostly unconnected the Internet or other PC/network devices, have limited battery life, and, are difficult to use. These currently available special function wrist watches additionally have user interfaces that are quite limited in what they can display. For example, in the context of setting time in digital watches, currently, the user is only enabled to set the hour and minute independently, with time only advancing in one direction. Furthermore, most of them have a 6 to 8 seven segment LED or LCDs which can be used to display 6 or 8 digits/letters, and have a small number of indicators that can display AM/PM, Alarm on/off, etc. only at fixed locations within the display. A few watches are currently appearing on the market that have slightly richer display characteristics. Regardless, these various shortcomings have to be solved, otherwise there is no compelling reason for these watches to become popular. The design of a wrist watch for mobile computing applications offers a significant challenge because the watch is a small device. That is, both fitting components and power supplies such as batteries into such a small volume and given the limited screen size of watches pose limitations that have be overcome. Solving these issues is worthy because the watch is an attractive form as 1) it is one of the few devices that a very large fraction of the population is already accustomed to worldwide, 2) is accessible almost all the time, and, 3) is hard to lose.

It would thus be highly desirable to provide a wearable device/appliance (a wrist watch) capable of wirelessly accessing information and equipped with an interactive user interface and high resolution display for providing a variety of desktop PC-like functions.

It would additionally be highly desirable to provide a wearable device/appliance (a wrist watch) capable of wirelessly accessing information and equipped with an interactive user interface equipped with a scroll device, e.g., roller ball, wheel or dial-type controller, for enabling scrolling through text and graphics displayed via the user interface.

Moreover, it would additionally be highly desirable to provide a wearable device/appliance (a wrist watch) capable of wirelessly accessing information and equipped with an interactive user interface equipped with a scroll device implementing a dynamic scroll speed controller for reducing the amount of user manipulation of the scroller to get to a particular point in the display the user wants to get to, while retaining fine-grain control over positioning.

SUMMARY OF THE INVENTION

It is an object of the present invention to provide a wearable device/appliance (a wrist watch) capable of wirelessly accessing information and equipped with an interactive user interface and high resolution display for providing a variety of desktop PC-like functions.

It is another object of the present invention to provide a wearable device/appliance (a wrist watch) capable of wirelessly accessing information and equipped with an interactive user interface including a scroll device implementing a dynamic scroll speed controller for enabling fine-grain and coarse-grain positioning of a scroll and/or cursor positioning of displayed content in a manner seamless to the user.

It is a further object of the present invention to provide a wearable device/appliance (a wrist watch) capable of wirelessly accessing information and equipped with an interactive user interface implementing a dynamic scroll device for enabling scrolling through text and graphics displayed via the user interface in a manner such that the amount of user manipulation of the scroller to get to a particular position in the display the user wants to get to is reduced, while retaining fine-grain control over positioning without needing excessive scroller manipulation.

According to the invention, there is provided a system and method for dynamically controlling scrolling functions of a display indicator provided in a wearable appliance that displays textual or graphical content, the appliance implementing a scroll device for generating scroll events in response to user manipulation thereof, the method comprising the steps of: receiving scroll events for incrementally advancing the indicator per scroll event in a first direction to provide fine-grain scroll indicator movement, and simultaneously tracking the advancing direction; determining a predetermined number of the fine-grain indicator increments in the first direction; and, thereafter, in response to continued receipt of scroll events, providing, in a manner that is seamless to a user, coarse-grain scroll indicator movement by advancing said indicator for a pre-determined number of increments per scroll event in the first direction, the coarse-grain scroll indicator movement greater than the fine-grain scroll indicator movement, whereby fewer scroll device manipulations are required to achieve a desired scroll indicator position on the display.

Advantageously, such a method and system may be implemented for any application requiring large scrolling movements, including an application providing time-keeping and time-setting display functions where the scroll device is manipulated for controlling minute and hour-hand indicators.

BRIEF DESCRIPTION OF THE DRAWINGS

Further features, aspects and advantages of the apparatus and methods of the present invention will become better understood with regard to the following description, appended claims, and accompanying drawings where:

FIG. 1 illustrates conceptually the wearable information access wrist watch device of the invention.

FIG. 3 illustrates the software architecture 200 for the Wrist Watch device 10.

DETAILED DESCRIPTION OF THE PREFERRED EMBODIMENTS

Figure 2:
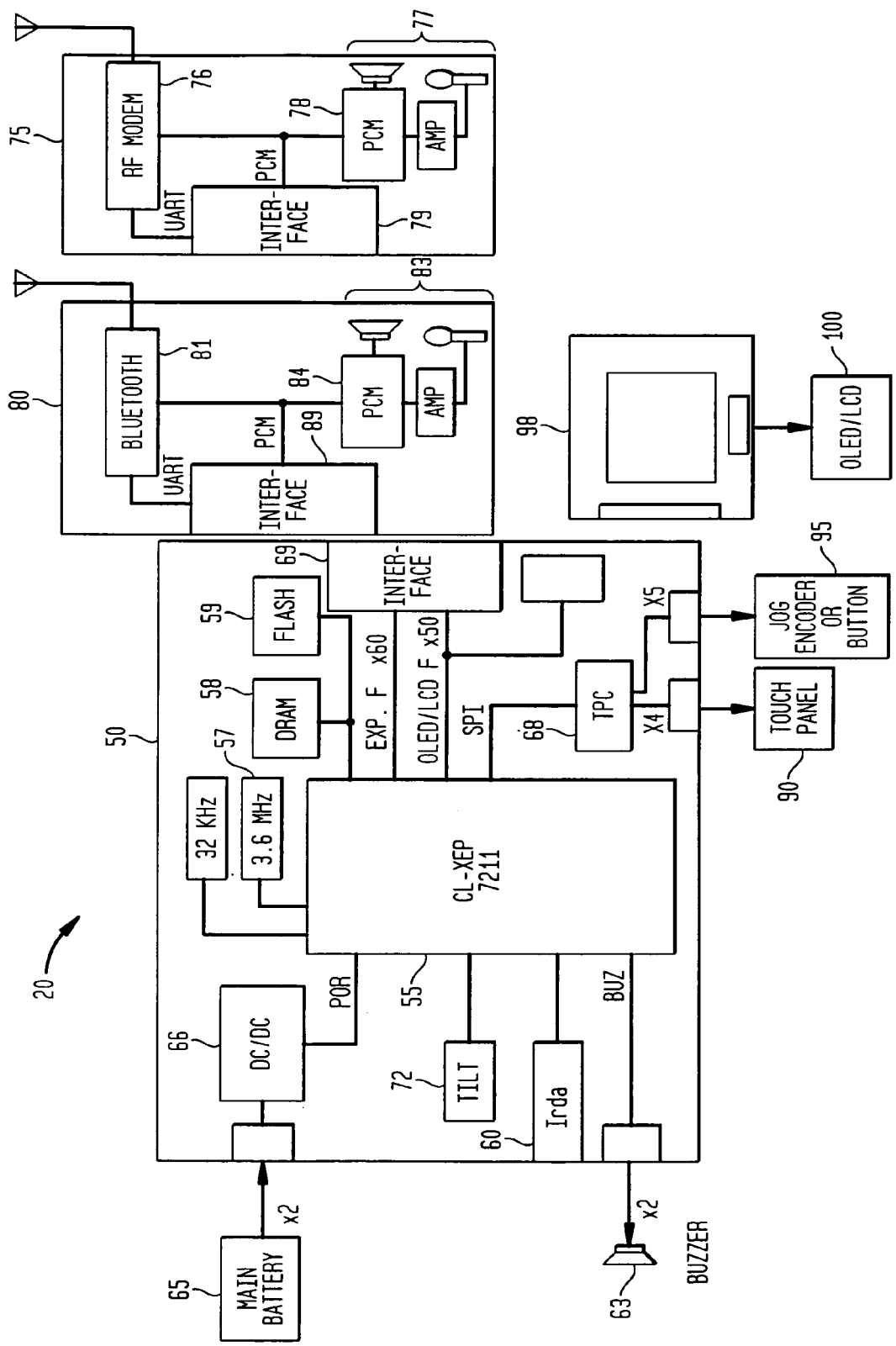
FIG. 2 is a detailed block diagram illustrating the hardware architecture of the Wrist Watch device 10 implementing the dynamic scroll device of the present invention.

FIG. 1 illustrates conceptually the wearable information access wrist watch device of the invention. Referred to herein as the "Wrist Watch" 10, the system looks like a regular watch but is capable of receiving information from adjunct devices such as a PC, a mobile computer, other pervasive devices being carried by the user and directly from a network via a wireless communications mechanism.

As shown in FIG. 1, the Wrist Watch device 10 is based on a modular concept designed to include a motherboard or base card 20 of minimum card size that leverages state-of-the-art technologies as will be described in greater detail herein. Specifically, the base card 20 may be implemented in various types of shells 25a, . . . , 25c for enabling various functions. For example, the base card 20 may be implemented in a basic shell 25a providing desktop like functionality via a touch screen display; a hands-free mobile shell 25b providing, in addition to basic desktop functionality, a communications interface with GPS and mobile phone communications capability etc., and including a touch screen display, scroll/pointing devices, and microphone and speaker devices; and an expanded function shell 25c, providing touch screen, buttons and support for various devices such as GPS/compass, thermometer, barometer, altimeter, etc.

FIG. 2 is a detailed block diagram illustrating the hardware architecture of the Wrist Watch system 10. As shown in FIG. 2, the base card 20 includes a first or main card 50 housing the core processing unit, I/O, and memory. For example the main card 50 includes a CPU 55, such as a Cirrus Logic CL-EP7211, which is a single-chip embedded controller functioning as a CPU for ultra-low-power applications, and armed with processing and enhanced memory management features to function equivalently as a 100 MHz Pentium. The core processing unit may operate at 2.5 V, and, to minimize the board size, may be equipped with a 3.68 MHz ceramic resonator 57 for generating the main frequency clock and timing signals. The main card 50 additionally includes sufficient nonvolatile and volatile memory including, for example, 64 Mbit EDO DRAM 58 and SRAM/Flash memory 59 that supports the system code. One communications subsystem of the Wrist Watch 10 includes a line of sight Infrared Data Association (IrDA) communications interface having a low-power IR transceiver module 60 mounted on the card 50 for direct connection with interface decoder pins of the CPU 55 which includes an IrDA SIR protocol encoder. The first card 50 additionally includes various Analog to Digital converters (ADC), memory refresh logic and industry standard interfaces such as a compact flash interface for example, so that other devices could be attached to the Wrist Watch 10. Other interfaces such as Universal Serial Bus (USB), and I2C, etc. may additionally be incorporated. FIG. 2 further illustrates the main card 50 as comprising power supply subsystem including a rechargeable Li-Polymer type battery 65 and a DC to DC converter 66 for supporting a wide dynamic range of Wrist Watch system/sub-system load.

With further reference to FIG. 2, the main card 50 has no audio capability but is equipped with a PCM audio interface in expansion tabs (not shown) for an accessory card, i.e., either card 75 or 80, in the expanded-shell Wrist Watch designs that support PCM audio. Particularly, the accessory card 75, 80 implemented includes a speaker and a microphone combination 77, 83 respectively, with the microphone functioning to record voice input which may be processed by the processor subsystem or stored in a storage subsystem for subsequent playback, and the speaker functioning to provide voice output, produce customized tones, and enable acoustic coupling with other listening devices, etc. As shown in FIG. 2, each speaker/microphone combination 77. 83 is connected to a respective pulse-coded modulation PCM coder/encoder devices (CODECs) 78, 84 which are controlled by a respective PCM interface 79,89 to the CPU 55. The accessory card 75, 80 is additionally equipped with various communications subsystems including low power and intermediary power radio frequency communications devices that support a Wireless Application Protocol ("WAP") used to provide communications links to mobile computers, mobile phones, portable handheld devices and, connectivity to the Internet. In one embodiment, the specific communications subsystems include circuitry for supporting BlueTooth 81 or like small-factor, low-cost radio solution circuitry, e.g., an RF-modem 76, and may include other low power radio and Flex-paging communications circuits (not shown), etc. For instance, as shown in FIG. 2, the auxiliary communication card 80 implements the BlueTooth industry standard for Radio Frequency (RF) communication, however, it is understood that other standards such as IEEE 802.11 or other RF protocols may be implemented as well. Moreover, portions of these communication protocols may be implemented on the processor on the main board 50 so that the total number of the components required is minimized. The CPU system on the main card 50 preferably employs a first Universal Asynchronous Receiver Transmitter (UART1) device (not shown) for supporting either the RF-modem 76 or Bluetooth 81 communications functionality and, may be equipped with a second UART device (UART2) providing support for data download functionality, e.g., from a PC or network server. It is understood that any like data transfer mechanism or data exchange interface device may be implemented to provide data download and RF communications support functionality.

For purposes of interacting with the device, the Wrist Watch system 10 is provided with a touch sensitive screen/panel 90 shaped within a standard watch form factor, and also a roller wheel mechanism, i.e., jog encoder 95. The touch sensitive screen enables the direct launching of applications by physical user entry of a graffiti "squiggle" in the manner such as described in commonly-owned co-pending U.S. patent application Ser. No. 09/607,596 entitled GRAFFITI BASED APPLICATION LAUNCH ON A SMART WATCH, the whole contents and disclosure of which is incorporated by reference as if fully set forth herein, and may initiate other applications/actions/events by physical touching of certain Wrist Watch display areas. In one embodiment, the touch sensitive screen panel is provided with a four (4) position touch screen. For instance, forward and back navigation for Wrist Watch displays is enabled by physically touching certain areas of the touch sensitive panel. The roller wheel mechanism 95 may be rolled up or down (i.e., clockwise or anticlockwise) to simulate a display cursor scrolling function for text and graphics. For example, in the context of the present invention, the roller wheel mechanism 95 generates signals that are A/D converted for receipt by the processor to enable movement of the Wrist Watch display cursor, and more particularly, movement of displayed minute hand and hour hand indicators for setting of various alarms and time-keeping functions provided by the Wrist Watch system. Preferably, when the wheel mechanism moves by more than a predetermined amount e.g. 20° degrees, the wheel generates a signal as a mouse device would when rolled. If a user rolls the wheel continuously, the wheel generates a signal for every 20 degrees of rotation (hereinafter "rotation event(s)"), with the event generated including an indication specifying whether the wheel was turned clockwise or anticlockwise. In this manner, the direction of the roller wheel, and consequently, the direction of cursor movement through a particular display, is tracked by the processor. The roller wheel mechanism additionally may be pushed or depressed to generate a signal (hereinafter "wheel click event(s)"), akin to a keypress or mouse click event, for activating a selected application, hyperlink or a menu item. In an alternate embodiment, the roller device may comprise a bezel which may be rotated and depressed for generating rotation and wheel click events respectively, such as described in commonly-owned co-pending U.S. patent application Ser. No. 09/607,594 entitled BEZEL BASED USER INTERFACE FOR A SMART WATCH, the whole contents and disclosure of which is incorporated by reference as if fully set forth herein. It is understood that other types of scroll device maybe implemented to provide cursor movement, e.g., a slider. Moreover, a standard button may be implemented for providing selection functions.

As further shown in FIG. 2, various Analog to Digital converters (ADC) 68 support an interface with the touch screen display panel 90, and an interface with the jog encoder or button for the roller wheel mechanism 95. An interface 69 is provided for a unit 98 housing a high resolution (VGA equivalent) emissive Organic Light Emitting Diode (OLED) high contrast display 100. Further, the main card 50 for the basic shell interfaces to a buzzer 63 controlled directly by the CPU 55 using its buzzer interface and timer counters. To detect the posture of the watch, a mechanical four-way tilt sensor 72 is further provided comprising mechanical switches (for detecting degree of tilt) producing signals which may be detected by the CPU. This sensor may be used for the various purposes such as power management, display control, etc. In a preferred embodiment, additional sensors may be attached to the Wrist Watch device over an interface. Examples may include additional tilt and motion (velocity, direction, speed) sensors, environment sensors such as thermal sensors, pressure sensors, health monitoring sensors such as blood pressure, etc. The Wrist Watch accordingly provides the display for the sensor and may also analyze the data collected from the sensors.

With more particularity, the high contrast display 100 of FIG. 2 does not need a backlight to make the display visible. Thus, the power consumed by the display is proportional to the number of pixels that are turned on in the display. Since the pixels preferably comprise light emitting diodes, the display is automatically visible at night and a user does not need to press any buttons to see the display. Moreover, the OLED display 100 may be viewed clearly at a wide variety of angles with the brightness of these displays being controlled by limiting the amount of current supplied to the diodes. In one embodiment, the OLED chip 100 is a high-resolution pixel addressable display, e.g., 640×480, for enabling the display of various textual and graphical items on the watch face, similar to what may be displayed on a computer screen or a Palm Pilot®. For example, the time may be represented by drawing the hour and minute hands on a watchface display. Further, the hands of the watchface display may be erased when, at some other time, a display of a photograph is desired to be displayed.

FIG. 3 illustrates the software architecture 200 for the Wrist Watch device 10. At its lowest level, the Wrist Watch system runs an operating system 210, e.g., LINUX 2.2.1, that permits multiple user level and kernel level threads to run and will support multitasking and multi-user support. Device drivers are provided for each input/output subsystem will handle low level device dependent code and interfaces so that higher level Application Programming Interfaces (APIs) can be implemented on top of them. The device drivers provided for each input/output subsystem include a serial I/O system driver 212, IrDA system driver 214, RF-Modem subsystem driver 216, Bluetooth system driver 218, flash memory 220, touch screen subsystem driver 222, LCD subsystem driver 224, OLED subsystem driver 226, roller wheel subsystem driver 228 and tilt sensor device driver 229. A client-server graphics subsystem 230, storage subsystem manager 240 and synchronization sub-system manager 250 is provided on top of the device drivers for receiving and transmitting I/O events between the applications, updating of the screen, etc. A graphics library is available for the application writer so that custom screens may be displayed. A user interface manager 255 is provided to process events received from user input devices such as the roller wheel (jog encoder) and touch panel for the appropriate applications. A communication subsystem manager 260 is provided to handle events from communication channels and pass the events to the right application to set things up for data transfers to proceed. The synchronization manager 250 is provided to synchronize data between the Wrist Watch and the other devices. Particularly, it receives the data from the communication channel and operates in conjunction with the right application to decode the sent data and update the data for the application receiving the data. An example of this would be an update to a calendar event. A system wide power manager 270 is provided to monitor and control power consumption on the device and communicate with other subsystems such as the operating system scheduler to optimize the battery life of the device. The power manager 270, for example, measures the power left in the battery, estimates the power required to run an application, and recommends what subsystems need to be shut down as the battery starts draining out.

Figure 4:
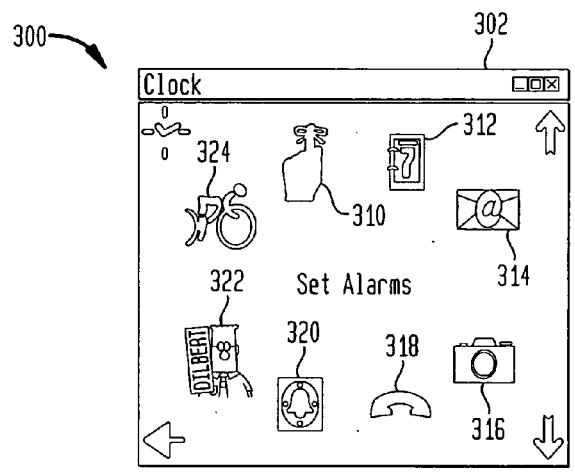
FIG. 4 illustrates an example OLED system display 300 providing a main menu of selectable icons for launching Personal Information Management applications provided in the Wrist Watch device.

As further shown in FIG. 3, the Wrist Watch device 10 is equipped with Wrist Watch shell application software 275 provided on top of the basic graphics, communication and synchronization subsystems. One key application supported is the microbrowser which enables access to a WAP supporting Web site and receives Web-based communications written in, for example, the Wireless Markup Language ("WML") using the XML standard. WML particularly is designed to optimize Internet text data for delivery over limited-bandwidth wireless networks and onto small device screens, and particularly, is devised to support navigation with limited input mechanisms, e.g., buttons. Details regarding the implementation of WML in the Wrist Watch device may be found in commonly-owned, co-pending U.S. patent application Ser. No. 09/608,042 entitled SYSTEM AND METHOD EMPLOYING WML ANNOTATIONS FOR USER INTERFACE CONTROL OF A WEARABLE APPLIANCE the contents and disclosure of which is incorporated by reference as if fully set forth herein. Other supported applications include Personal Information Management (PIM) applications software 280. FIG. 4 illustrates an example system display 300 providing a main menu 302 comprising selectable icons for launching the following PIM applications: an icon 310 for launching an application directed to displaying/maintaining "to do" lists, an icon 312 for launching an application directed to displaying/maintaining calendars and appointments, an icon 314 for launching an application directed to retrieving/storing/displaying e-mail messages, an icon 316 for launching an application directed to retrieving/storing/displaying digital photographs and bit-mapped images, an icon 318 for launching an application directed to retrieving/storing (displaying phone lists, an icon 320 for launching an application directed to setting of time and alarms which is shown highlighted and indicated by the displayed text "SET ALARMS", an icon 322 for launching an application directed to retrieving/ storing/displaying comic images such as Dilbert© United Feature Syndicate, Inc., and, an icon 324 for launching an application directed to providing stop watch and elapsed time features. Other applications may include those enabling the receipt of excerpts of personalized data, such as traffic information, weather reports, school closings, stock reports, sports scores, etc., from the world wide web. These excerpts may be received as notifications or alarms on the Wrist Watch system 10. Inter-device interaction software applications are included to permit the watch display to become the display for another device such as a GPS located in a concealed location, (e.g., a bag), or a thermostat on the wall, etc. Thus, this application software enables communication between the other device and the Wrist Watch by receiving/ displaying the data and transmitting back information sent from the Wrist Watch. As a further example, caller Id information may be displayed on the Wrist Watch display when the cell phone that belongs to that person rings.

Typically, multiple persons are congregated in a room and carry their cell phones in a hand bag or wear them on their belts, have a hard time determining which cell phone is ringing when a ringing tone is heard in a room. This results in every person in the room pulling out his/her cell phone out of their handbag or belt to check if it is the one that is ringing. The caller Id display feature of the Wrist Watch device is particularly advantageous as each wearer may simply glance at the watch and would immediately know if the ringing phone belonged to him/her, in addition, to determining who the calling party is facilitating the decision of whether or not he/she should answer the phone. In a further example, this application software may allow the data from the Wrist Watch storage subsystem 240 to be viewed on another device such as on a PDA, PC, and other community viewing devices. In the preferred embodiment, middleware such as Tcl/Tk, Javascript, Perl, or the like etc., may run on top of the operating system, graphics and communication manager APIs for facilitating rapid development of these applications the Wrist Watch device 10.

As discussed above, the roller wheel may be manipulated either clockwise or anti clockwise, for cursor movement within a Wrist Watch text or graphic display generating either rotation events, or wheel click events when depressed. The present invention is directed to the manner in which the rotation events and wheel click events are interpreted so as to reduce the number of events required to accomplish tasks on the Wrist Watch via the interface.

Figure 5A:
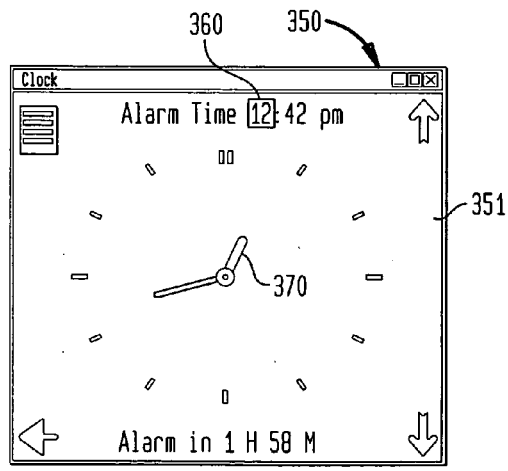
FIGS. 5(a) and 5(b) illustrates the Wrist Watch user interface 350 provided for performing alarm setting functions.
Figure 5B:
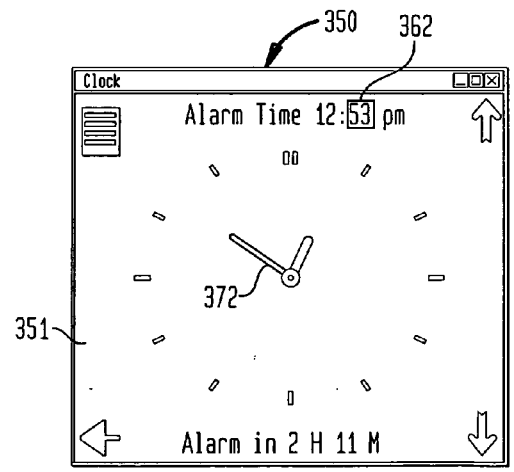

One task that the user may need to perform on the watch is to set the hour and minute hands to a particular value; for example, to set an alarm for a particular time. FIGS. 5(a) and 5(b) illustrates a Wrist Watch user interface 350 providing an alarm setting feature as described in detail in commonly-owned, co-pending U.S. patent application Ser. No. 09/608, 043 entitled ALARM INTERFACE FOR SMART WATCH, the whole contents and disclosure of which is incorporated by reference as if fully set forth herein. As shown in FIGS. 5(a) and 5(b) there is provided the Wrist Watch display 350 comprising a watch face 351 having indicators 360, 362 corresponding to hour hand 370 and minute hand 372, respectively, for setting an alarm notification time in hours and minutes via control of the Wrist Watch roller wheel device. The problem addressed by the present invention is to enable precise control for setting the alarm (as shown via watch indicators 360, 362) to a particular value (for example, to 12:53 PM) but avoid having to continuously turn the roller wheel so that it generates a large number of rotation events (for example, 53 events to set the minute hand to 53).

The methodology of the present invention is to dynamically vary the number of minutes the minute hand moves forward per rotation event while tracking the latest direction in which the roller wheel is moving. If the current direction is the same as the previous direction and the minute hand is positioned so that the current minute indicated is a multiple of a predetermined number, e.g., five (5), the minute hand moves forward or back by five (5) minutes (depending on the direction of rolling). When the direction changes, the minute hand moves by single or (1) minute increments instead of five (5) minute increments, for example. Thus, in an example of setting watch hands 370, 372 to a value of 6:43 AM, in order to move the minute hand from 0 to 43, from a position where the minute hand is currently at a twelve o'clock position, the user will first roll the wheel clockwise for five (5) clicks to go from 0 to 1 to 2 so on till five (5). Then, in the same direction, the user will roll the wheel clockwise for eight (8) more clicks to get the minute hand to forty-five (45), and then back (anti-clockwise) two (2) clicks to get to forty-three (43).

It is understood that variants of this method are possible. For example, instead of just using increments of 1 and 5, the steps may be dynamically increased, for instance, using steps of 1, 5 and 15. In this case, given the present example, the user will first roll for five (5) clicks to get to five (5). Then, in the same direction, the user will roll the wheel clockwise for two (2) more clicks in the same direction to get to fifteen (15) and then two (2) more clicks to get to forty-five (45). Then two clicks anti-clockwise to get to forty-three (43). In other words, when the rolling direction is unchanged and the minute hand hits a 15 minute boundary, the hand advances by 15 minutes; if it hits a 5 minute boundary (but not a 15 minute boundary), it advances by 5 minutes.

A related idea is to independently control the hour and minute hands and to switch the control of the roller from one to the other on a wheel click event. To set the time to 6:43 AM, the roller could first be controlling the hour hand, with each click moving the hand by 1 hour. Once the hour hand has been set to 6 AM, a roller wheel click event fixes the hour hand and now controls the minute hand which is set as described above with the dynamically varying interpretation of the roller clicks.

The detailed algorithm for providing dynamic speed scrolling of the minute hand in order to reduce the amount of user manipulation of the scroller to get to a particular position that the user wants to reach while retaining fine-grain control over positioning without needing excessive scroller manipulation, is as follows:

```
Forward Click
if { (lastdir == fwd) && (minute % 5) == 0 } {
        minute = minute + 5
    } else {
        minute = minute + 1
}
if { minute >= 60 } {
        minute = minute − 60
        hour = (hour + 1) % 24
}
lastdir = fwd
Reverse Click
    if { (lastdir == rev) && (minute % 5) == 0 } {
        minute = minute − 5
    } else {
        minute = minute − 1
    }
    if { minute < 0 } {
        minute = minute + 60
        hour = (hour − 1 + 24) % 24
    }
    lastdir = rev
```

It is understood that the present invention may be used for other forms of scrolling where one needs fine control over a wide range. Dynamic scrolling may be used in any situation which benefits from fast movement and where any overshoot may be corrected quickly with small reverse steps. So this applies to scrolling through text, scrolling through horizontal time lines, spread sheets, moving past TV program listings, months in a calendar, etc.

Accordingly, a generalized version of the algorithm is as follows:

```
A: if (wheel_forward signal) {
        if (last_wheel_signal = reverse) forward_movements = 0;
        forward_movements = forward_movements + 1;
        last_wheel_signal = forward;
B:  if (forward_movements > high_forward_threshold)
        scroll forward by high_forward_increment;
C:  else scroll forward by low_forward_increment;
D:  } else if (wheel_reverse_signal) {
        if (last_wheel_signal = forward) reverse_movements = 0;
        reverse_movements = reverse_movements + 1;
        last_wheel_signal = reverse;
E:  if (reverse_movements > high_reverse_threshold)
        scroll reverse by high_reverse_increment;
F:  else scroll reverse by low_reverse_increment;
    }
```

It is not necessary that the high_forward_increment equal the low_forward_increment though it may be desired to keep these values symmetric.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for dynamically controlling speed of a scroll device providing scroll functions for setting time of a time keeping display having minute and hour indicators, said scroll device generating scroll signals representing scroll events and communicating said signals to a control device for advancing said minute and hour indicators in response thereto, said method comprising:

a) receiving first scroll signals from said scroll device and, in response to received first scroll signals, incrementally advancing a time keeping display minute indicator in a first direction according to fine-grain time increments, and simultaneously tracking the advancing direction;

b) counting said received first scroll signals; and, c) thereafter, in response to continued receipt of first scroll signals, seamlessly advancing said time keeping display minute indicator according to coarse-grain time increments in said first direction when a count of said received first scroll signals exceeds a predetermined number, said coarse-grain time increments greater than said fine-grain time increments, whereby fewer scroll device manipulations are required to achieve a desired time set without notice to the user; and, d) receiving second scroll signals in response to manipulating said scroll device to change direction of said time keeping display minute indicator;

e) determining said change in direction; and, f) incrementally advancing said time keeping display minute indicator in said changed direction according to fine-grain time increments, wherein said time keeping display minute indicator movement is changed from coarse-grain time movement in said first direction to fine-grain time movement in said changed direction.

2. The method as claimed in claim 1, wherein said scroll device generates scroll events in response to manipulation thereof, said generated scroll signals corresponding to said scroll events, wherein said fine-grain time increments of said display minute indicator corresponds to one (1) minute increment per scroll event.

3. The method as claimed in claim 2, wherein said coarse-grain time increments of said display minute indicator corresponds to five (5) minutes increments per scroll event.

4. The method as claimed in claim 3, wherein said step c) of providing coarse-grain time increments includes incrementally advancing said display minute indicator a predetermined number of time increments per one or more scroll events and increasing said pre-determined number for each subsequent one or more scroll events.

5. The method as claimed in claim 1, wherein said scroll device further generates click events in response to manipulation thereof, and generates third scroll signals corresponding to said click events for communication to said control device, said method further comprising the step of: independently enabling scroll device control of either said time keeping display minute indicator or said time keeping display hour indicator upon receipt of a third scroll signal.

6. A system for dynamically controlling a display indicator navigating through a high-resolution display provided in a wearable appliance that displays textual or graphical content, said system comprising:

a scroll device for manipulation by a user to provide said scrolling functions for advancing said display indicator, said scroll device generating scroll events; and, a control device for receiving said scroll events, tracking an advancing direction of said indicator by counting received scroll events, and providing dynamic speed control of said indicator by advancing said display indicator according to fine-grain and coarse-grain increments in response to a count of said received scroll events and said tracked direction, said control device receiving first scroll signals from said scroll device and, in response to received first scroll signals, incrementally advancing said display indicator in a first direction according to fine-grain indicator movements, and simultaneously tracking the advancing direction and, counting said received first scroll signals; and, said control device thereafter, in response to continued receipt of first scroll signals, seamlessly advancing said display indicator according to coarse-grain time increments in said first direction when a count of said received first scroll signals in said first direction exceeds a predetermined number, said coarse-grain display indicator movement greater than said fine-grain display indicator movement such that fewer scroll device manipulations are required to navigate to a desired text or graphical content in said display; and, said control device further receiving second scroll signals in response to manipulating said scroll device to change navigation direction of said display indicator, said control device determining said change in direction; and, incrementally advancing said display indicator in said changed direction according to fine-grain display movement, wherein said display indicator movement is changed from coarse-grain movement in said first direction to fine-grain movement in said changed direction.

7. A system for dynamically controlling a time keeping display indicator navigating through a time keeping display having minute and hour indicators for a time keeping function, said system comprising:

a scroll device for manipulation by a user to provide a scroll function for advancing said indicator, said scroll device generating scroll signals representing scroll events and communicating said signals to a control device for advancing said minute and hour indicators in response thereto;

said control device for receiving first scroll signals from said scroll device and, in response to received first scroll signals, incrementally advancing a time keeping display minute indicator in a first direction according to fine-grain time increments, and simultaneously tracking the advancing direction and, counting said received first scroll signals; and, said control device thereafter, in response to continued receipt of first scroll signals, seamlessly advancing said time keeping display minute indicator according to coarse-grain time increments in said first direction when a count of said received first scroll signals in said first direction exceeds a predetermined number, said coarse-grain time increments greater than said fine-grain time increments, whereby fewer scroll device manipulations are required to achieve a desired time set without notice to the user; and, said control device further receiving second scroll signals in response to manipulating said scroll device to chance direction of said time keeping display minute indicator, said control device determining said change in direction; and, incrementally advancing said time keeping display minute indicator in said changed direction according to fine-grain time increments, wherein said time keeping display minute indicator movement is changed from coarse-grain time movement in said first direction to fine-grain time movement in said changed direction.

8. The system as claimed in claim 7, wherein said scroll device is a roller wheel.

9. The system as claimed in claim 7, wherein said scroll device is a mouse wheel.

10. A program storage device readable by a machine, tangibly embodying a program of instructions executable by the machine to perform method steps for dynamically controlling a display indicator capable of navigating through a display provided in a wearable appliance that displays textual or graphical content, said appliance implementing a scroll device for generating scroll events in response to user manipulation thereof, said method steps including the steps of:

a) receiving scroll events for incrementally advancing said indicator per scroll event in a first direction to provide fine-grain scroll indicator movement, and simultaneously tracking the advancing direction;

b) counting said received scroll events; and, c) thereafter, in response to continued receipt of scroll events, providing in a manner that is seamless to a user, coarse-grain scroll indicator movement by advancing said indicator for a pre-determined number of increments per scroll event in said first direction when a count of said received scroll events exceeds a predetermined number, said coarse-grain scroll indicator movement greater than said fine-grain scroll indicator movement, whereby fewer scroll device manipulations are required to navigate to a desired text or graphical content in said display and, d) receiving scroll events in response to manipulating said scroll device to change navigation direction of said display indicator;

e) determining said change in direction; and, f) incrementally advancing said display indicator per received scroll event in said changed direction to provide fine-grain display indicator movement, wherein said display indicator movement is changed from coarse-grain display movement in said first direction to fine-grain display movement in said changed direction.

11. A method for dynamically controlling a display indicator navigating through a display provided in a wearable appliance that displays textual or graphical content, said appliance implementing a scroll device for generating scroll events in response to user manipulation thereof, said method comprising the steps of:

a) incrementally advancing said display indicator in response to each received scroll event in a first direction to provide fine-grain indicator movement, and simultaneously tracking the advancing direction;

b) counting said received scroll events;

c) thereafter, in response to continued receipt of scroll events, seamlessly advancing said display indicator according to coarse-grain indicator movements in said first direction when a count of said received scroll events in said first direction exceeds a predetermined number, said coarse-grain indicator movements greater than said fine-grain indicator movements in said display, whereby fewer scroll device manipulations are required to navigate to a desired text or graphical content in said display; and, d) receiving scroll events in response to manipulating said scroll device to change navigation direction of said display indicator;

e) determining said change in direction; and, f) incrementally advancing said display indicator per received scroll event in said changed direction to provide fine-grain display indicator movement, wherein said display indicator movement is changed from coarse-grain display movement in said first direction to fine-grain display movement in said changed direction.

* * * * *